(12) United States Patent
Messineo et al.

(10) Patent No.: US 11,976,890 B2
(45) Date of Patent: May 7, 2024

(54) CONCENTRICALLY HEATED INLET TUBE FOR GAS SCRUBBING APPARATUS

(71) Applicant: Airgard, Inc., San Jose, CA (US)

(72) Inventors: Daniel L. Messineo, Fremont, CA (US); Husain Lohawala, Sunnyvale, CA (US); Mark W. Johnsgard, Aptos, CA (US)

(73) Assignee: Airgard, Inc., San Jose, CA (US)

( * ) Notice: Subject to any disclaimer, the term of this patent is extended or adjusted under 35 U.S.C. 154(b) by 276 days.

(21) Appl. No.: 17/731,146

(22) Filed: Apr. 27, 2022

(65) Prior Publication Data

US 2022/0349659 A1 Nov. 3, 2022

Related U.S. Application Data

(60) Provisional application No. 63/181,702, filed on Apr. 29, 2021.

(51) Int. Cl.
*F28F 1/10* (2006.01)
*B01D 53/78* (2006.01)
*F28D 7/10* (2006.01)

(52) U.S. Cl.
CPC ............. *F28F 1/10* (2013.01); *B01D 53/78* (2013.01); *F28D 7/10* (2013.01); *F28D 7/103* (2013.01); *F28D 7/106* (2013.01)

(58) Field of Classification Search
CPC .... F28F 1/10; F28D 7/10; F28D 7/103; F28D 7/106; F28D 7/026; B01D 53/68; B01D 53/77; B01D 53/78
See application file for complete search history.

(56) References Cited

U.S. PATENT DOCUMENTS

| | | | |
|---|---|---|---|
| 2005/0276739 A1* | 12/2005 | Shiban | B01D 53/70 422/174 |
| 2013/0213231 A1* | 8/2013 | Hoy-Petersen | B01D 53/504 96/306 |
| 2015/0044104 A1* | 2/2015 | Feng | B01D 53/005 422/173 |

* cited by examiner

*Primary Examiner* — Joseph F Trpisovsky
(74) *Attorney, Agent, or Firm* — Gard & Kaslow LLP

(57) ABSTRACT

A heated inlet tube for use in a wet scrubber is disclosed. In one embodiment, the heated inlet tube comprises a heated tube concentric to the inlet tube to which a heated gas is applied thereby maintaining temperature of a waste gas stream as it flows through the inlet tube. In a further embodiment, an insulating tube concentrically surrounds the heated tube to further maintain the temperature of the waste gas stream.

10 Claims, 2 Drawing Sheets

CONCENTRICALLY HEATED INLET TUBE FOR GAS SCRUBBING APPARATUS

This application claims priority to Provisional Application No. 63/181,702, filed Apr. 29, 2021, which is incorporated by reference herein in its entirety.

FIELD OF THE INVENTION

The present invention relates generally to controlling the temperature of process gas streams and more specifically to doing so at the inlet tube of a gas scrubbing apparatus.

BACKGROUND OF THE INVENTION

A variety of industrial processes create gas streams that must be scrubbed of contaminants before being released to the outside world. The manufacture of electronics, solar cells, display devices, communications devices, metals, ceramics, and polymers, as well as the processing of chemicals, drugs, and other materials, often requires the use of exhaust gas scrubbers. Scrubbers typically receive a substantially gaseous exhaust stream (sometimes containing fine particles or fine mists) and remove contaminants from the stream before the stream is released to the environment.

Exhaust streams from electronic fabrication processes may include a variety of contaminants, including but not limited to perfluorocarbon (PFC) etch gases such as $SF_6$, $NF_3$, $CF_4$, $C_2F_6$, $C_4F_8$, $COF_2$, and $C_4F_6$. Exhaust streams may also include toxic hydrides such as $AsH_3$, $PH_3$, $P_2H_4$, or $B_2H_6$, pyrophoric or flammable gases such as $SiH_4$, $H_2$, $Si_2H_6$, $GeH_4$, and/or gases such as $WF_6$, $SiF_4$, $HCl$, $BCl_3$, $Cl_2$, $TiCl_4$, $F_2$, $HF$, and various chlorosilanes. Other industrial processes may also create toxic or polluting exhaust streams particular to a specific material or manufacturing process.

In such processes, a proportion of the gas supplied to the process chamber may be exhausted from the chamber, together with solid and gaseous by-products from the process occurring within the chamber. Further, a process tool may have a plurality of process chambers, each of which may be at a respective different stage in a deposition, etching or cleaning process. Therefore, during processing a waste stream may be formed from a combination of the gases exhausted from the chambers that may have various different chemical or particulate compositions.

Thus, before the waste gas stream is vented into the atmosphere, it is typically treated to remove selected gases and solid particles therefrom. Acid gases such as HF and HCl are often soluble in water, and are commonly removed from a waste gas stream using a wet scrubber, for example, a spray or packed bed/tower type scrubber, in which the acid gases are taken into solution by a scrubbing liquid flowing through the scrubber. Some contaminants are water-reactive, and may or may not dissolve in water, depending upon various conditions. These contaminants may also react with water to form solid reaction products.

For waste gas streams including a variety of contaminants, effective scrubbing may require multiple systems, such as a wet scrubber to remove water-soluble contaminants combined with a combustion chamber to combust water-insoluble contaminants.

It is desirable to prevent such waste gas streams from condensing or depositing on the various surfaces of the systems, particularly in the case of a wet scrubber. This condensation or deposition can clog the inlet and prevent the contaminants from reaching the scrubber. A known approach is to heat the line carrying the waste gas stream before it reaches the wet scrubber inlet, typically 150-180 degrees Celsius {"C"} but sometimes at or above 220 degrees C.

However, this known approach of heating the line carrying the incoming waste gas stream to the input to the wet scrubber has been determined by the present inventors to be inadequate. This is because the transition of the waste gas stream from the heated line to the inlet tube of the wetted scrubber chamber can create a zone where the wetted section (i.e., where water is introduced to the process gas stream inside the wet scrubber) cools the walls of the inlet tube of the wet scrubber thereby creating cooler areas where the waste gas stream can condense or deposit.

Further, in some cases the waste gas stream contains gases that require heated lines to prevent changes to those incoming gases. If certain waste gas stream gases are allowed to cool prior to wet abatement, the properties of those gases can change where wet scrubbing is no longer as efficient at abating those gases. This can be caused by chemical changes in the gas itself or by the gas changing state from a gas to a liquid or solid.

Still further, in some cases the gases abated with a wet scrubber create highly corrosive acids in the wet scrubber water. These corrosives can etch many common wet scrubber building materials such as stainless steel. Thus, most wet scrubbers are made out of plastics with a high corrosion resistance (e.g., Polyvinyl Chloride ("PVC") or Polypropylene ("PP")). These materials, however do not have a high thermal range and typically must be kept below 40 degrees C. and thus cannot be directly heated as can be done with materials such as stainless steel.

Referring now to FIG. 1, an example wet scrubber and inlet of the prior art can be seen. In this example, an inlet tube 101, typically made of metal or plastic, extends down into the wetted area of scrubber 102 so the exit of inlet tube 101 directs the waste gas stream 103 into a fully wetted volume inside scrubber 102. In some configurations, inlet tube 101 may extend into a water vessel where the water is circulating around the inlet tube. Many waste gas streams where wet abatement is used can react aggressively with moisture and generate heat so it is important to have the area where the inlet tube is inserted into the wet scrubber be fully wetted and able to dissipate the reaction heat generated.

However, as pointed out above, it has been determined by the present inventors that such an inlet tube in a wet scrubber will not maintain the hot surfaces required to keep the waste gas stream at a high enough temperature to prevent reaction and/or condensation and/or deposition. This is because the wetted outer wall of the inlet tube inside the wet scrubber will cool the inlet tube and the waste gas stream.

An insulating material 104 could be placed around the inlet tube 101, as shown in the figure, to slow the change in heat flow. However, it has been determined that even with such an insulating material the lower portion of inlet tube 101 and the waste gas stream 103 will still cool significantly.

Another possibility is installing electrical heating elements down in the wetted area of a wet scrubber. However, due to limited space (inlet tubes for wet scrubbers used in semiconductor processing are typically on the order of 1-3 inches in diameter) and potential exposure to highly-corrosive waste gas streams, this is not generally feasible.

Accordingly, it would be useful to have an improved way to maintain the waste gas stream at a high temperature throughout the inlet tube of a wet scrubber without simply relying on added insulating materials or electrical heating elements.

SUMMARY OF THE INVENTION

An improved inlet tube for a wet scrubber is disclosed.

One embodiment discloses a system configured to maintain the temperature of a waste gas stream entering a wet scrubber, the system comprising: an inlet tube configured to receive the waste gas and pass the waste gas stream to an interior of the wet scrubber; a heated tube surrounding the inlet tube with a gap between an interior of the heated tube and an exterior of the inlet tube, wherein the heated tube is configured to receive a heated gas into the gap.

In a further embodiment, the system further comprises an insulating material surrounding an outside of the heated tube.

In a still further embodiment of the system, wherein the heated tube configured to receive a heated gas into the gap is further configured to create a flow curtain.

In a further still embodiment of the system, wherein the heated tube configured to receive a heated gas into the gap is further configured to create turbulence at an exit of the inlet tube.

In a yet further embodiment of the system, wherein the heated tube surrounding the inlet tube is configured to direct the heated gas exiting the heated tube into the waste gas stream inside the wet scrubber.

DETAILED DESCRIPTION OF THE INVENTION

An improved inlet tube for use in a wet scrubber is disclosed. In one embodiment, the improved inlet tube comprises a heated tube concentric to the inlet tube to which a heated gas is applied. In a further embodiment, an insulating tube concentrically surrounds the heated tube. Each of these embodiments, and various elements of each, will now be described.

Figure 1:
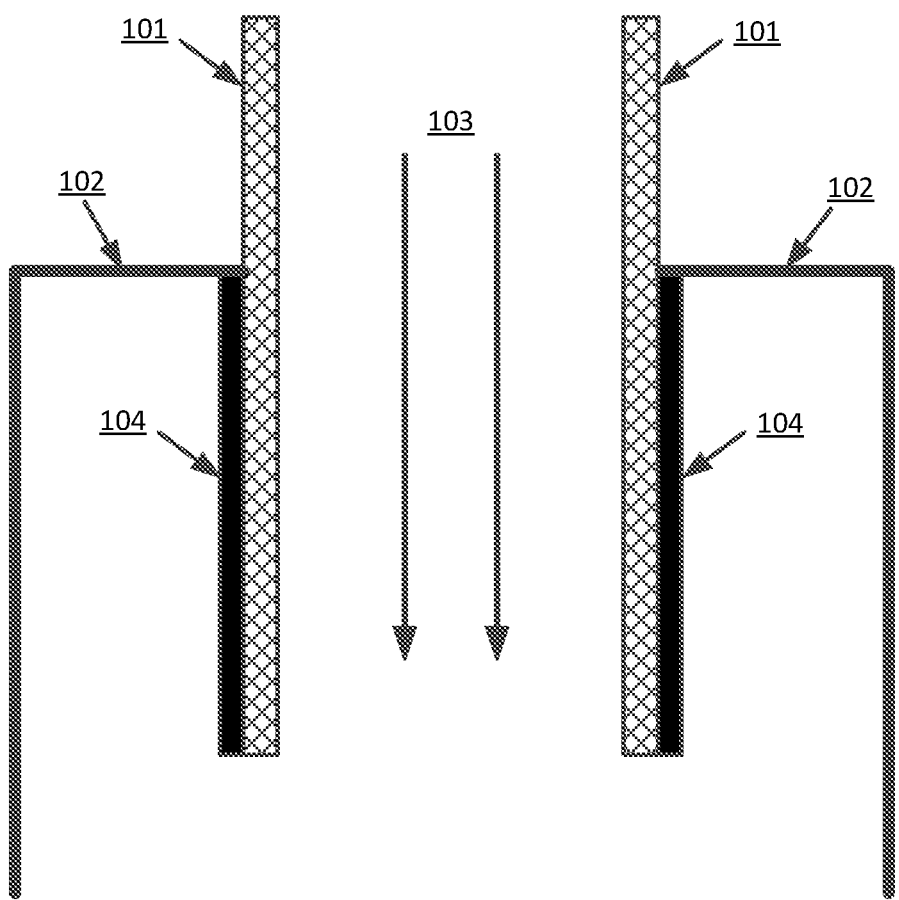
FIG. 1 is an example wet scrubber and inlet of the known prior approach.
Figure 2:
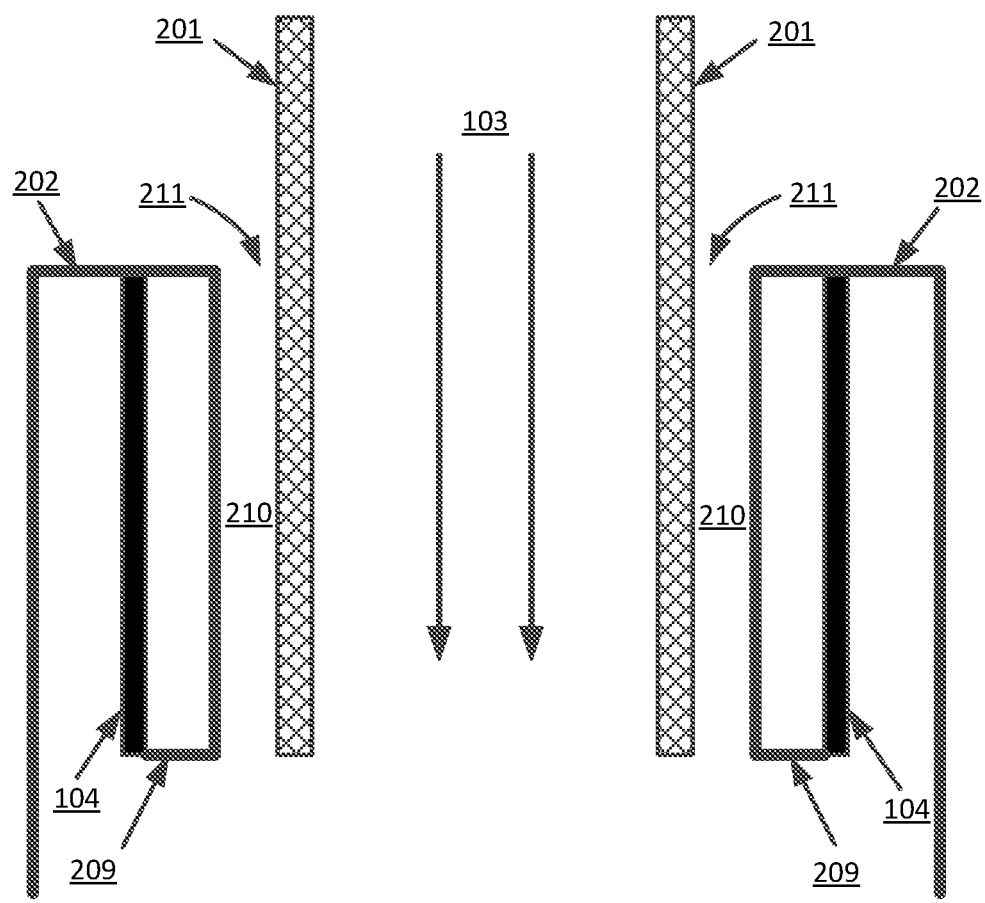
FIG. 2 is an example wet scrubber and inlet of the present approach according to some embodiments.

Referring now to FIG. 2, one embodiment of the improved inlet tube of the present approach can be seen. As with the prior approach discussed with reference to FIG. 1, inlet tube 201 can be any material, but is typically a corrosive resistant metal, and extends down into the wetted area of scrubber 202 so the exit of inlet tube 201 directs waste gas stream 103 into a fully wetted volume inside scrubber 202. In the present approach, surrounding inlet tube 201 is a heated tube 209 located concentric to inlet tube 201 that creates a gap 210 between an inner surface of heated tube 209 and an outer surface of inlet tube 201. A hot gas 211 is supplied to gap 210 so that hot gas 211 passes down inside heated tube 209 and along the outer surface of inlet tube 201.

Hot gas 211 maintains the temperature of inlet tube 201 and waste gas stream 103 all the way down to the end (the end towards the wetted zone within scrubber 202) of inlet tube 201. Hot gas 211 then exits heated tube 209 and combines with waste gas stream 103 inside scrubber 202. As would be understood by one of skill in the art in light of the teachings herein, hot gas 211 can be directed into waste gas stream 103 in a number of ways. In one embodiment, hot gas 211 creates a flow curtain (i.e., a laminar flow around a perimeter of waste gas stream 103) to minimize waste gas stream 103 reaching the wetted surfaces inside scrubber 202 too quickly. In another embodiment, hot gas 211 creates a turbulence at the exit of inlet tube 201 to improve reaction rates of waste gas stream 103 inside scrubber 202.

One view of the present approach is that its objective is opposite to the known prior approach of simply insulating the inlet tube. This despite both approaches being directed to maintaining the temperature of the waste gas stream in the inlet tube. Simply insulating the inlet tube operates by attempting to block the flow of heat from in-to-out, that is, from inside the inlet tube to outside the inlet tube. Conversely, the present approach of using a heated tube around the inlet tube causes the flow of heat from out-to-in, that is, from the heated gas in the surrounding heated tube to the outside of the inlet tube to the inside of the inlet tube.

In various embodiments, heated tube 209 can be any material but is typically an insulating material, Polytetrafluoroethylene ("PTFE") or some other form of corrosive resistant plastic. Heated tube 209 is typically round in cross-section but can be any shape that creates the surrounding gap 210 between heated tube 209 and inlet tube 201. In some embodiments, there may be points of contact between the inside of the heated tube 209 and the outside of the inlet tube 201 to center and maintain spacing. In some embodiments, insulating material 104 can be placed around the outside of the heated tube, as shown in the figure, to further slow the change in heat flow. In some of those embodiments, an air gap can be located between heating tube 209 and insulating material 104 to still further slow the change in heat flow.

In various embodiments, hot gas 211 can be any temperature but is typically heated to at or above the temperature of waste gas stream 103. Determining the temperature of waste gas stream 103 can be determined in any known fashion including by using a temperature gauge at or near inlet tube 201.

In various embodiments, hot gas 211 is an inert gas, for example nitrogen or argon, rather than helium or arsine, and would be chosen by an implementor of the present approach based on the particulars of a given implementation (waste gas stream elements, type of scrubber, materials used, etc.).

A controller (not shown) can be included in a given embodiment to receive a signal from a temperature gauge (also not shown) indicating the temperature of the waste gas stream. The controller can also provide signals to control a temperature control means for setting and/or maintaining the temperature of the hot gas directed to the heated tube.

Other elements known in the art, such as connectors, valves, nozzles, etc., may be deployed in a given implementation, all of which are determinable by one of skill in the art in light of the teachings herein.

Lab results show the present approach greatly improves maintaining the temperature of the waste gas stream through the input tube. Measurements show that using the known prior approach, that is without any insulation or a heated tube around the inlet tube, a waste gas stream entering the inlet tube at 150 degrees C. and flowing at 150 standard liters per minute ("SLM") has dropped to approximately 80 degrees C. at the exiting end of the inlet tube. Similarly, measurements show that using the other known approach, that is having insulation located around the inlet tube, a waste gas stream entering the inlet tube at 150 degrees C. and flowing at 150 SLM dropped to approximately 115 degrees C. at the exiting end of the inlet tube. Conversely, measurements show that using this new approach, that is with a heated tube around the inlet tube and with insulation located around the heated tube, again with a waste gas stream entering the inlet tube at 150 degrees C. and flowing at 150 SLM instead only dropped to approximately 145 degrees C., thus essentially maintaining the temperature of the waste gas stream throughout the length of the inlet tube.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above. It will also be apparent that in some instances the order of the processes described herein may be altered without changing the overall result of the performance of all of the described processes, as well as the possible use of different types of air scrubbing systems.

It should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc. It may be possible to incorporate some methods into hard-wired logic if desired. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A system configured to maintain the temperature of a waste gas stream entering a wet scrubber, the system comprising:
    an inlet tube configured to receive the waste gas stream and pass the waste gas stream to an interior of the wet scrubber;
    a heated tube surrounding the inlet tube with a gap between an interior of the heated tube and an exterior of the inlet tube, wherein the heated tube is configured to receive a heated gas into the gap.

2. The system of claim 1 further comprising an insulating material surrounding an outside of the heated tube.

3. The system of claim 2 wherein the insulating material surrounding an outside of the heated tube is located such that it creates an air gap between the insulating material and the heated tube.

4. The system of claim 1 wherein heated tube is concentric with the inlet tube.

5. The system of claim 1 wherein the heated tube is made of Polytetrafluoroethylene ("PTFE").

6. The system of claim 1 wherein the heated gas is maintained at a temperature at least that of the waste gas stream.

7. The system of claim 1 wherein the heated gas is an inert gas.

8. The system of claim 1 wherein the heated tube configured to receive a heated gas into the gap is further configured to create a flow curtain.

9. The system of claim 1 wherein the heated tube configured to receive a heated gas into the gap is further configured to create turbulence at an exit of the inlet tube.

10. The system of claim 1 wherein the heated tube surrounding the inlet tube is configured to direct the heated gas exiting the heated tube into the waste gas stream inside the wet scrubber.

* * * * *